United States Patent [19]
Roy et al.

[11] Patent Number: 6,101,732
[45] Date of Patent: Aug. 15, 2000

[54] DECKLID FIXTURE

[75] Inventors: Michael Roy, St. Brampton; Anthony Osborne, Brampton, both of Canada

[73] Assignee: Chrysler Corporation, Auburn Hills, Mich.

[21] Appl. No.: 09/134,972

[22] Filed: Aug. 17, 1998

[51] Int. Cl.[7] .................................................. G01D 21/00
[52] U.S. Cl. .................................. 33/613; 33/194; 33/600
[58] Field of Search ............................. 33/613, 194, 533, 33/600, 645, 501, 608

[56] References Cited

U.S. PATENT DOCUMENTS

| | | | |
|---|---|---|---|
| 3,104,473 | 9/1963 | Rose | 33/194 |
| 4,606,129 | 8/1986 | Barrowman et al. | 33/613 |
| 4,744,135 | 5/1988 | Roels | 29/267 |
| 4,861,099 | 8/1989 | Sasamura et al. | 296/202 |
| 4,893,863 | 1/1990 | Skonieczny et al. | 296/76 |
| 4,987,671 | 1/1991 | Clausen-Schaumann | 29/434 |
| 5,029,930 | 7/1991 | Ihrke et al. | 296/76 |
| 5,074,609 | 12/1991 | Dear | 296/76 |
| 5,158,333 | 10/1992 | Saville | 296/76 |
| 5,325,585 | 7/1994 | Sasaki et al. | 29/897.2 |
| 5,396,707 | 3/1995 | Blase | 33/194 |
| 5,551,162 | 9/1996 | Struble | 33/613 |

*Primary Examiner*—Andrew H. Hirshfeld
*Attorney, Agent, or Firm*—Lawrence J. Shurupoff

[57] ABSTRACT

A fixture adapted to set a decklid for an opening to a trunk of an automotive vehicle in an adjusted position such that when the decklid is closed relative to the opening a gap of predetermined width will be established between a side edge of a rim portion of the decklid and an adjacent side edge of the opening. The fixture includes a clamp body having a planar support surface and a clamping surface projecting away from the support surface. A clamp bar is mounted on the support surface of the body for reciprocal movement toward and away from the clamping surface to clamp the rim portion of the decklid and thereby secure the fixture to the decklid. A cam is mounted on the clamp body for moving the clamp bar. A blade is mounted on the clamp bar and extends along the side edge of the rim portion of the decklid. The blade is adapted to contact the edge of the opening when the decklid is closed.

9 Claims, 4 Drawing Sheets

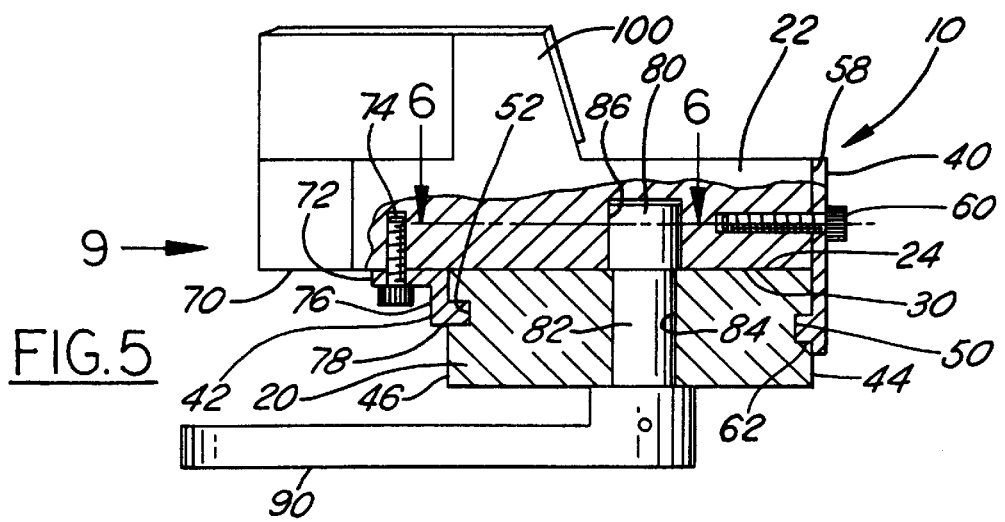

DECKLID FIXTURE

This invention relates to a fixture for setting a gap between a rim of a lid and an edge of an opening closed by the lid.

BACKGROUND AND SUMMARY OF THE INVENTION

Mounting a decklid for the trunk of a motor vehicle in a properly centered relation to the trunk opening can be difficult and time-consuming. Tools used in the past have tended to scratch and/or damage the decklid and adjacent vehicle panel surfaces. What is needed is a small, lightweight fixture which can be used to set the decklid in a properly centered position, which is fast acting and which will not mar or otherwise damage the vehicle.

A fixture according to the present invention is provided having a clamp body provided with a clamping surface. A clamp bar is mounted on the body for movement toward and away from the clamping surface to clamp a rim portion of the decklid and thereby secure the fixture thereto. A blade is mounted on the clamp bar and extends along a side edge of the rim portion of the decklid in contact therewith so that when the decklid is closed the blade will contact the adjacent side edge of the opening to indicate that the decklid is properly centered.

The blade is preferably removably mounted so that it may be replaced by another blade of different thickness.

The cam bar is preferably mounted on a planar surface portion of the clamp body for reciprocal movement and has a clamping surface spaced from the clamping surface of the clamp body, the two surfaces cooperating in clamping the rim portion of the decklid.

In the preferred embodiment, the clamp bar is moved by a cam. The cam is preferably non-circular and is mounted in a hole in the clamp bar, so that when the cam is rotated, a projecting portion of the cam will press against a side of the hole to effect the reciprocal movement necessary to clamp the fixture on the decklid.

Preferably the clamp body has a projecting ledge which is adapted to rest on suitable vehicle support structure such as a water trough.

It is preferred that two fixtures be employed, one clamped to the decklid near one side edge and the other clamped to the decklid near the other side edge.

One object of this invention is to provide a fixture for mounting a lid such as a decklid in an opening which has the foregoing features and capabilities.

Another object is to provide a fixture which is composed of a relatively few simple parts, is rugged and durable in use, and is capable of being inexpensively manufactured and easily operated.

These and other objects, features and advantages of the invention will become more apparent as the following description proceeds, especially when considered with the accompanying drawings.

BRIEF DESCRIPTION OF THE DRAWINGS

FIG. 5 is an elevational view of the fixture with parts broken away and in section.

FIG. 6 is a sectional view taken on the line 6—6 in FIG. 5, and shows the clamp bar in a retracted position.

FIG. 7 is a view similar to FIG. 6 but shows the clamp bar in an advanced clamping position.

DETAILED DESCRIPTION OF THE PREFERRED EMBODIMENT

Figure 1:
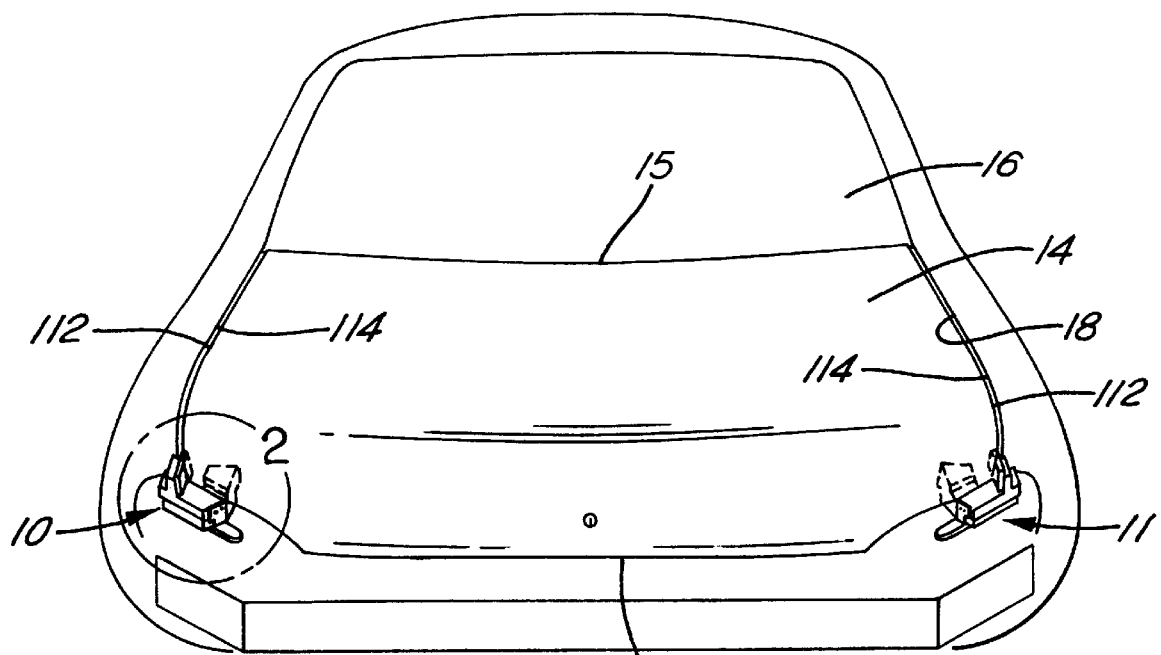
FIG. 1 is a rear view of an automobile showing two fixtures, each constructed according to the invention, secured to the decklid at opposite corners.
Figure 2:
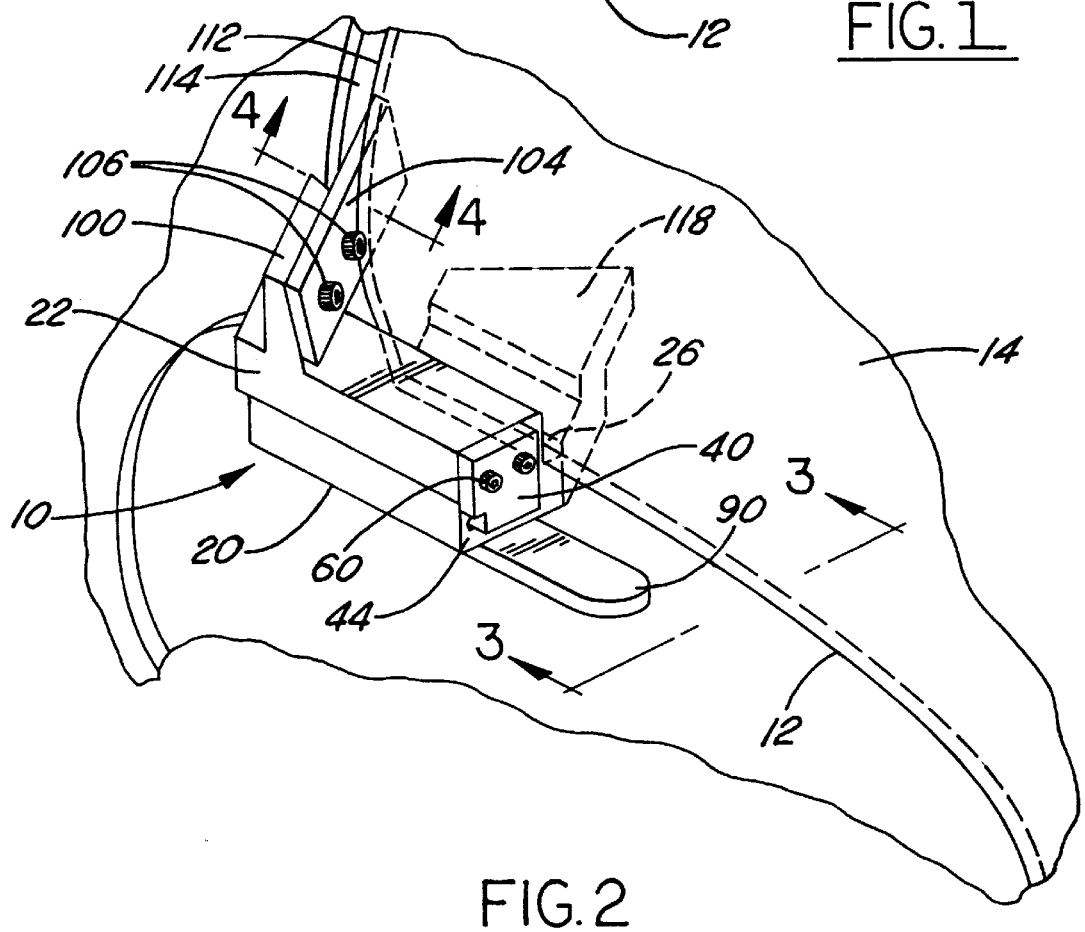
FIG. 2 is an enlarged perspective view of the structure shown within the circle 2 in FIG. 1.

Referring now more particulary to the drawings, FIG. 1 shows two fixtures 10 and 11 secured to opposite corners of the rear, swinging edge portion 12 of a decklid 14. The forward edge portion 15 of the decklid is hinged to the vehicle body 16 for pivotal movement about a transverse, horizontal axis by laterally spaced hinges (not shown). The decklid is adapted, when closed, to close the opening 18 to the trunk 21 at the rear of the vehicle. The fixtures 10 and 11 are constructed in accordance with the present invention and since they are mirror images of one another, a description of the fixture 10 will suffice for both.

Figure 3:
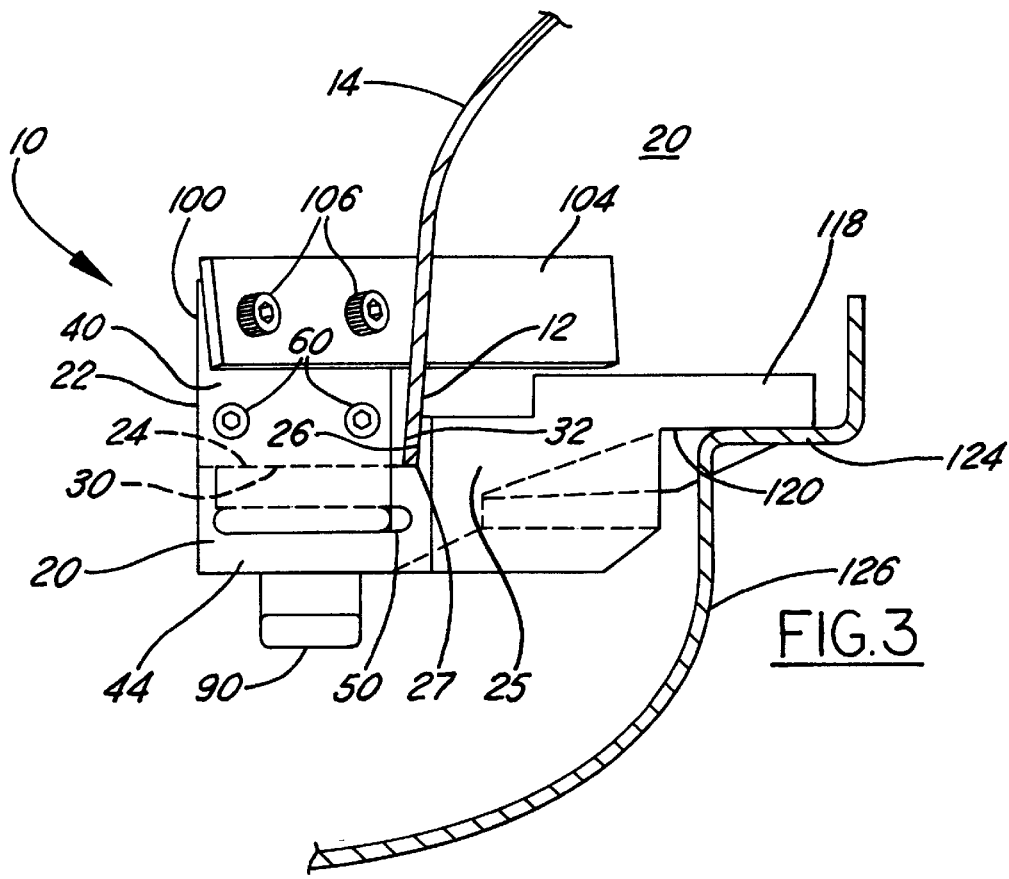
FIG. 3 is a sectional view taken on the line 3—3 in FIG. 2.

The fixture 10 includes a clamp body 20 and a clamp bar 22. The clamp body 20 is of integral, one-piece construction and has a flat upper support surface 24 (FIG. 3). An abutment wall 25 has a clamping support surface 26 rising upwardly from one side edge 27 of the support surface 24. The clamping surface 26 is flat and may be perpendicular to the support surface 24 or it may, as shown, form with the support surface, an angle slightly larger than 90°.

The clamp bar 22 has a flat lower surface 30 slidably supported on the upper support surface 24 of the clamp body. The clamp bar has a flat clamping surface 32 which is laterally spaced from, parallel and directly opposed to the clamping surface 26 of the clamp body.

The clamp bar 22 is supported for transverse sliding movement toward and away from the clamping surface 26 of the clamp body along a path perpendicular to the side edge 27 of the support surface, so that the clamping surface 32 of the clamp bar is at all times parallel to the clamping surface 26 of the clamp body.

Guiding the transverse sliding movement of the clamp bar are a generally flat plate 40 and a Z-shaped plate 42 (FIG. 5) which extend along the parallel end faces 44 and 46 of the clamp body. The end faces 44 and 46 are perpendicular to the side edge 27 of the support surface 24 of the body. The end face 44 has an elongated slot 50 (FIG. 3) and the end face 46 has an elongated slot 52 (FIG. 5). The slots 50 and 52 are parallel to one another and extend parallel to the path of movement of the clamping bar. The clamp bar 22 has an end face 58 (FIG. 5) which is parallel to and co-planar with the end face 44 of the clamp body and to which the plate 40 is secured by fasteners 60. The plate 40 is parallel to and has a surface-to-surface sliding engagement with the end face 44 of the clamp body and has an integral rib 62 slidably received in the slot 50.

The clamp bar 22 has an extended portion provided with a bottom surface forming a co-planar extension 70 of the surface 30 to which one leg 72 of the Z-shaped plate 42 is secured by fasteners 74 (FIG. 5). The mid-portion 76 of plate 42 is parallel to and has a surface-to-surface sliding engagement with the end face 46 of the clamp body. The other leg 78 of the Z-shaped plate 42 is slidably received in the slot 52.

The clamp bar is moved along its path toward and away from the clamping surface 26 of the clamp body by camming structure including a cam 80 (FIGS. 5–8). The cam 80 is mounted on one end of a stub shaft 82 which is rotatably confined in a cylindrical bore 84 formed in the clamp body 20. The cam 80 extends into a hole 86 in the clamp bar 22. The shaft 82 and cam 80 are manually rotated by a handle 90 projecting laterally outwardly from the opposite end of the shaft 82.

The hole 86 preferably has a somewhat non-circular cross section as shown in FIGS. 6 and 7. The cam is non-circular having the contour shown in FIG. 8. The cam has a quadrant 91 of relatively small radius, a diametrically opposite quadrant 92 of relatively large radius, and intermediate quadrants 94 and 96 of gradually increasing radius. This construction provides the cam with a radially outward projection 97 including the large diameter quadrant 92 and the intermediate quadrants 94 and 96.

When the cam 80 is turned to the FIG. 6 position, the projection 97 retracts the clamp bar 22 away from the clamping surface 26 of the clamp body 20 to provide a relatively large space between the clamping surfaces 26 and 32. When the cam is turned to the position shown in FIG. 7, which is 180° from the FIG. 6 position, the projection 97 of the cam advances the clamp bar 22 towards the clamping surface 26 to reduce the width of the space between the clamping surfaces 26 and 32.

Figure 4:
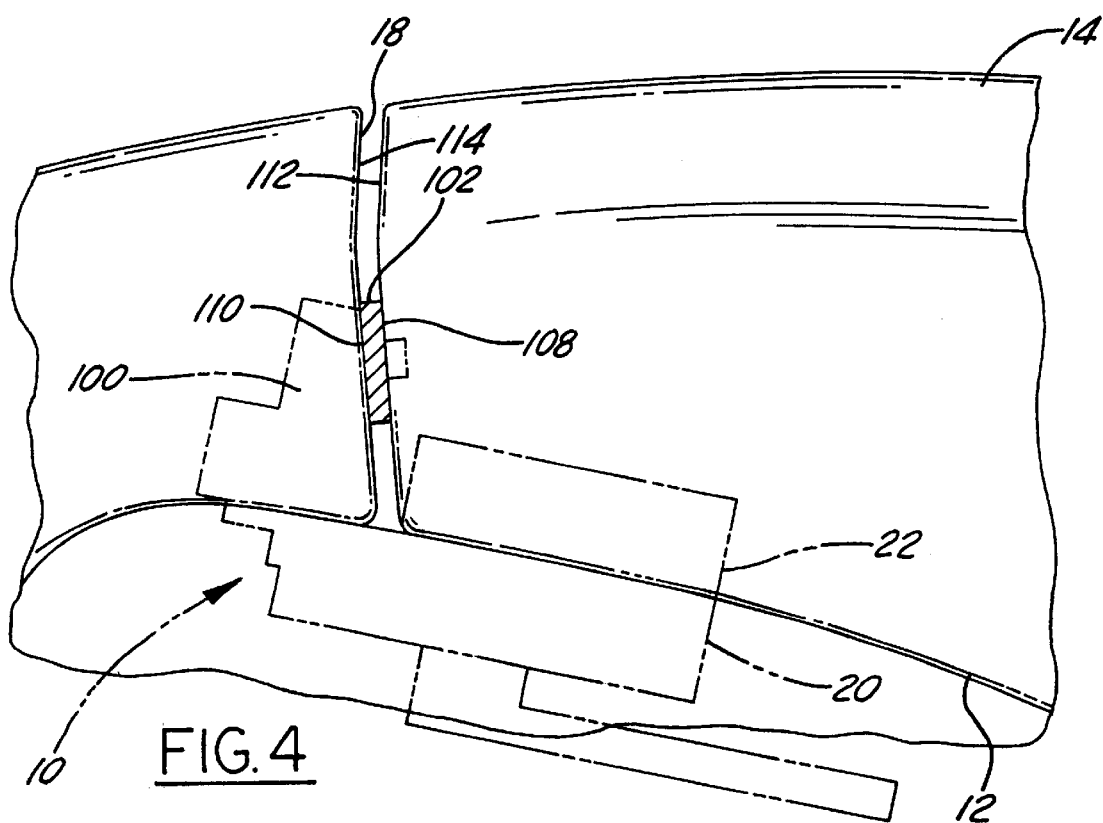
FIG. 4 is a sectional view taken on the line 4—4 in FIG. 2.
Figure 8:
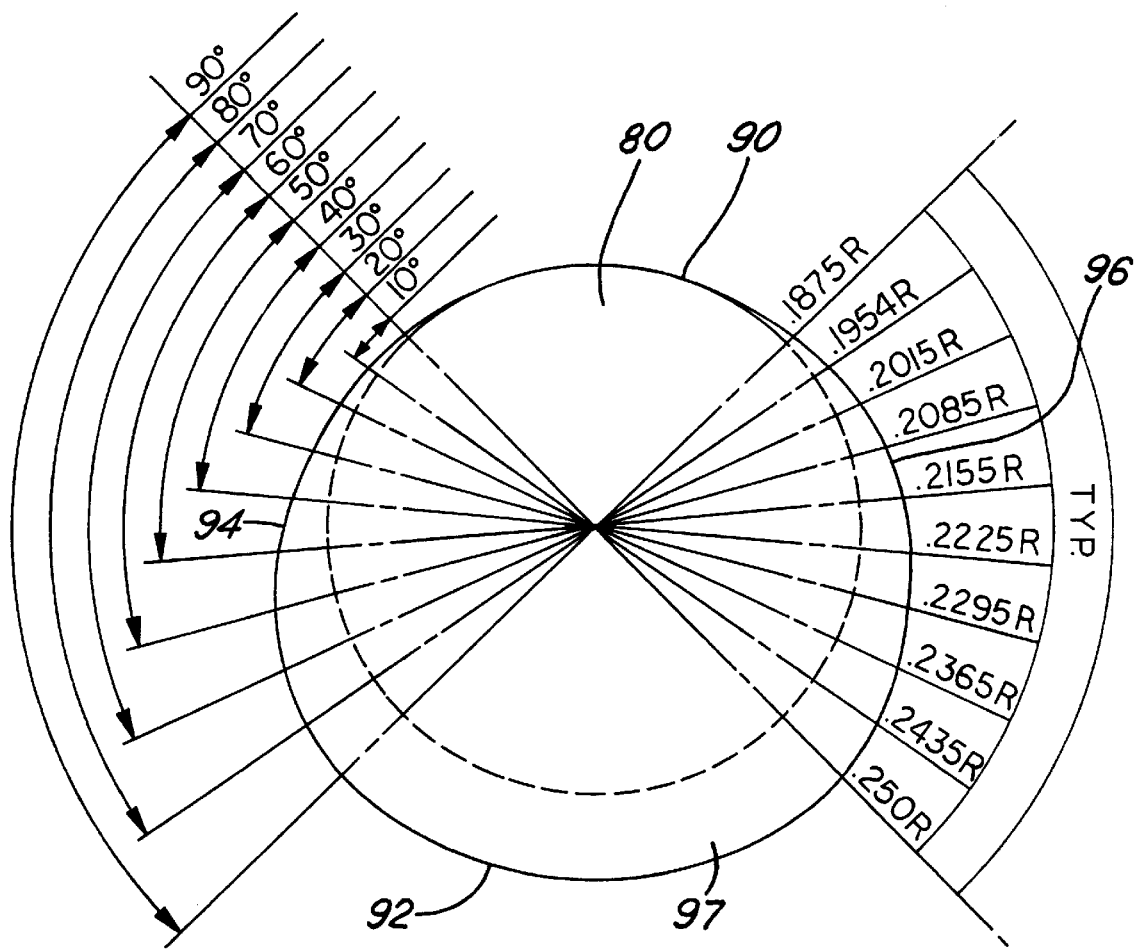
FIG. 8 is an elevational view of the cam illustrating the configuration thereof.
Figure 9:
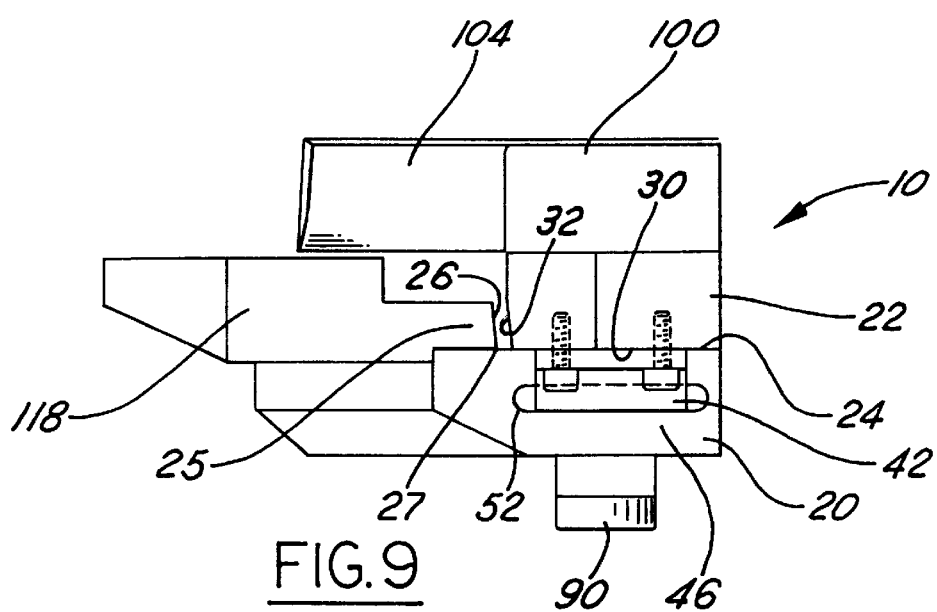
FIG. 9 is an elevational view of the fixture looking in the direction of the arrow 9 in FIG. 5.

The clamp bar 22 has an upstanding projecting portion 100 provided with a flat surface 102. A flat rectangular blade 104 is secured to the flat surface 102 of the projecting portion 100 by fasteners 106. The blade has flat parallel opposite surfaces 108 and 110 (FIG. 4) and is of uniform thickness. When inserted between a side edge 112 of the rim of the decklid 14 and an adjacent side edge 114 of the trunk opening 18, and assuming the decklid is shifted laterally toward the side edge 114, the blade will provide a gap of predetermined dimension between the side edge 114 of the opening and the side edge 112 of the decklid.

The blade is removable by withdrawing the fasteners 106. This will permit substitution of different blades having different widths to vary the gap depending on the circumstances and car models involved.

The clamp body 20 has an integral, laterally outwardly extending ledge 118 formed with a bottom surface 120 (FIG. 3). The bottom surface 120 of the ledge is parallel to surface 24 and is adapted to rest on a portion of rigid vehicle body structure such as a flange 124 of the water trough 126.

In use, the fixtures 10 and 11 are secured to the swinging edge rear portion of the decklid adjacent the opposite corners thereof as seen in FIG. 1. At this time, the decklid is in the raised or open position. The cam 80 of each fixture is rotated to retract the clamp bar as in FIG. 6. Then the fixtures are mounted on the decklid as shown in FIG. 1 with the rim of the decklid extending into the space between the clamping surfaces 26 and 32 of the fixtures. The cam of each fixture is then turned 180° to the FIG. 7 position to advance the clamp bar 22 and move the clamping surface 32 toward the clamping surface 26 and firmly grip the rim portion of the decklid therebetween. In the process, and prior to tightly securing the fixtures to the decklid, the fixtures are manipulated so that the blades 104 extend along the side edges 112 of the rim of the decklid adjacent to the rear corners.

When the decklid is closed, the blades 104 will contact both the side edge portions 112 of the rim of the decklid and the adjacent side edges 114 of the opening 18 to establish the desired gap. This will automatically center the decklid whereupon the decklid hinges may be secured to the vehicle body to set the decklid in a transversely centered location. It is possible that the centering of the decklid can be accomplished by using only one of the fixtures and relying on the blade of that one fixture to center the decklid. However, it is preferable to use two of the fixtures in the manner shown and described herein.

What is claimed is:

1. A fixture adapted to set a lid for an opening in an adjusted position such that when the lid is closed relative to the opening a gap of predetermined width will be established between a side edge of a rim portion of the lid and an adjacent side edge of the opening, said fixture comprising, a clamp body having a clamping surface, a clamp bar mounted on said body for movement toward and away from said clamping surface to clamp said rim portion of the lid against said clamping surface and thereby secure said fixture to the lid, means for moving said clamp bar toward and away from said clamping surface, and a blade mounted on said clamp bar and extending along said side edge of the lid in contact therewith when the fixture is secured to the lid, said blade being adapted to contact said side edge of the opening when said lid is closed.

2. A fixture as in claim 1, wherein said means for moving said clamp bar comprises a cam.

3. A fixture as in claim 1, wherein said means for moving said clamp bar comprises a cam mounted for rotation on said clamp body, and a handle projecting from said cam for rotating said cam.

4. A fixture as in claim 1, wherein said blade is removably and replaceably mounted on said clamp bar.

5. A fixture adapted to set a decklid for an opening to a trunk of an automotive vehicle body in an adjusted position such that when the decklid is closed relative to the opening a gap of predetermined width will be established between a side edge of a rim portion of the decklid and an adjacent side edge of the opening, said fixture comprising, a clamp body having a planar support surface and an abutment wall provided with a first clamping surface projecting away from said support surface, a clamp bar, means mounting said clamp bar on said support surface of said body for reciprocal movement toward and away from said clamping surface to clamp said rim portion of the decklid against said clamping surface and thereby secure said fixture to the decklid, means including a cam mounted on said clamp body for moving said clamp bar toward and away from said clamping surface, and a blade mounted on said clamp bar and extending along said side edge of the decklid in contact therewith when said fixture is secured to the decklid, said blade being adapted to contact said side edge of the opening when the decklid is closed.

6. A fixture as in claims 5, wherein said cam is rotatably mounted in a hole in said clamp bar, said cam is non-circular with a projecting portion adapted to press against an arcuate portion of said hole to effect the said reciprocal movement of said clamp bar, and a handle projects from said cam to rotate said cam.

7. A fixture as in claim 6, wherein said clamp bar has a second clamping surface spaced from and substantially parallel to said first clamping surface, said clamping surfaces cooperating in clamping said rim portion of the decklid.

8. A fixture as in claim 7, wherein said clamp body has a projecting ledge adapted to rest on a portion of the vehicle body when said fixture is secured to the decklid.

9. A fixture as in claim 8, wherein said blade is removably and replaceably mounted on said clamp bar.

* * * * *